United States Patent
Jiang et al.

(10) Patent No.: US 7,022,741 B2
(45) Date of Patent: Apr. 4, 2006

(54) GAS AGITATED MULTIPHASE CATALYTIC REACTOR WITH REDUCED BACKMIXING

(75) Inventors: Yi Jiang, Ponca City, OK (US); Jianping Zhang, Ponca City, OK (US); Rafael L. Espinoza, Ponca City, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 127 days.

(21) Appl. No.: 10/402,498

(22) Filed: Mar. 28, 2003

(65) Prior Publication Data

US 2004/0192987 A1  Sep. 30, 2004

(51) Int. Cl.
C07C 27/00 (2006.01)
(52) U.S. Cl. .................. 518/700; 518/711; 518/715
(58) Field of Classification Search ............. 518/700, 518/711, 715
See application file for complete search history.

(56) References Cited

U.S. PATENT DOCUMENTS

| | | | | |
|---|---|---|---|---|
| 4,313,848 | A | * | 2/1982 | Scott .......................... 502/47 |
| 5,827,902 | A | | 10/1998 | Maretto et al. ............. 518/706 |
| 6,201,031 | B1 | * | 3/2001 | Steynberg et al. .......... 518/715 |
| 6,825,237 | B1 | | 11/2004 | Schweitzer et al. ......... 518/715 |

FOREIGN PATENT DOCUMENTS

GB  2 358 816 A  8/2001

OTHER PUBLICATIONS

Dreher et al., *Liquid-Phase Backmixing in Buble Columns. Structured by Introduction of Partition Plates*, Catalysis Today 69 (2001) 165-170.
Bell et al., *Analysis of the Design of Bubble-Column Reactors for Fischer-Tropsch Synthesis*, Ind. Eng. Chem. Process Des. Dev. 1985, 24 (pp. 1213-1219).
Stern et al., *A Theoretical Model for the Performance of Bubble-Column Reactors used for Fischer-Tropsch Synthesis*. Chemical Engineering Science, vol. 40, No. 9, pp. 1665-1677 (1985).
Sie et al., *Fundamentals and Selection of Advanced Fischer-Tropsch Reactors*. Applied Catalysis A: General 186 (1999) pp. 55-70.
Krishna et al., *Design and Scale-Up of the Fischer-Tropsch Bubble Column Slurry Reactor*, Fuel Processing Technology 64 (2003) pp. 73-105.
Maretto et al., *Design and Optimisation of a Multi-Stage Bubble Column Slurry Reactor for Fischer-Tropsch Synthesis*, Catalysis Today 66 (2001) pp. 241-248.
PCT Search Report in PCT/US04/08937 dated Mar. 4, 2005 (2 pp.).

* cited by examiner

*Primary Examiner*—J. Parsa
(74) *Attorney, Agent, or Firm*—Conley Rose P.C.

(57) ABSTRACT

The present invention provides an apparatus and method for optimizing the degree of backmixing within a gas agitated multiphase reactor at a given gas linear velocity. The embodiments of the present invention involve novel configurations of the multiphase reactor internal structures. In general, the configurations comprise creating a dense area of internal structures in the central region and/or wall regions of the multiphase reactor.

28 Claims, 10 Drawing Sheets

GAS AGITATED MULTIPHASE CATALYTIC REACTOR WITH REDUCED BACKMIXING

CROSS-REFERENCE TO RELATED APPLICATIONS

This application is related to commonly assigned, co-pending U.S. Utility Application Ser. No. 60/458,818, filed Mar. 28, 2003, entitled Process and Apparatus for Controlling Flow in a Multiphase Reactor, which is hereby incorporated herein by reference.

STATEMENT REGARDING FEDERALLY SPONSORED RESEARCH OR DEVELOPMENT

Not applicable.

FIELD OF THE INVENTION

The present invention relates to an apparatus and method for optimizing the degree of backmixing within a gas agitated multiphase reactor. In particular, the present invention provides a new and improved method for producing hydrocarbons from synthesis gas.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas. Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen or with oxygen and steam to form syngas, which is a combination of carbon monoxide gas and hydrogen gas. In the second transformation, known as the Fischer-Tropsch process, carbon monoxide is reacted with hydrogen to form organic molecules containing carbon and hydrogen. Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

Typically the Fischer-Tropsch product stream contains hydrocarbons having a range of numbers of carbon atoms, and thus having a range of molecular weights. Thus, the Fischer-Tropsch products produced by conversion of natural gas commonly contains a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to additional processing steps for conversion to liquid and/or gaseous hydrocarbons. Thus, in the production of a Fischer-Tropsch product stream for processing to a fuel it is desirable obtain primarily hydrocarbons that are liquids and waxes (e.g. $C_{5+}$ hydrocarbons).

Fischer-Tropsch reactions are generally carried out in gas agitated multiphase reactors. However, gas agitated multiphase reactors, including gas-solid, gas-liquid, and gas-liquid-solid reactor are widely used in chemical, petrochemical and biochemical processes. These types of gas agitated multiphase reactors often suffer from a high degree of backmixing. During backmixing, gas introduced into a reactor will tend to have a higher gas holdup and upward flow in the central region of the reactor while there is a lower gas holdup and a downward flow in the annular or outer region of the reactor. The degree of backmixing can affect many of the essential characteristics of the reactor and reaction including but not limited to conversion rates, productivity, mass transport capabilities, gas distribution and heat control.

In spite of recent developments, there remains a need for catalysts and processes that are more efficient, flexible, cost effective and/or productive for obtaining desirable hydrocarbon products. The present invention is an improvement toward fulfilling one or more those needs.

SUMMARY OF THE INVENTION

The present invention provides an apparatus and method for optimizing the degree of backmixing within a gas agitated multiphase reactor at a given gas linear velocity. The embodiments of the present invention involve novel configurations of the multiphase reactor internal structures. These configurations may result in marked improvement in many areas with respect to multiphase reactors including but not limited to reduced backmixing, improved gas distribution, improved mass transport capabilities, smaller gas bubbles, improved reaction distribution, improved control over the heat of reaction and/or increased flexibility in reactor design. Any one or more of these benefits may result in decreased costs, increased conversion and increased productivity.

In accordance with the broad aspects of the present invention, the reactor internals are configured such that there is a dense distribution of internal structures in the central and/or wall regions within the reactor. The internal structures are typically cooling or heating tubes but can be additional active or non-active structures located within the reactor. The present invention is an improvement for all multiphase reactors with backmixing or gas distribution problems.

Accordingly, another embodiment of the present invention comprises an improved method for using a multiphase reactor with the configurations described and claimed herein. In particular, the present invention is useful in Fischer-Tropsch multiphase reactors. Thus, another embodiment of the present invention comprises an improved method for producing hydrocarbons using a multiphase reactor with the configurations described and claimed herein.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1B:
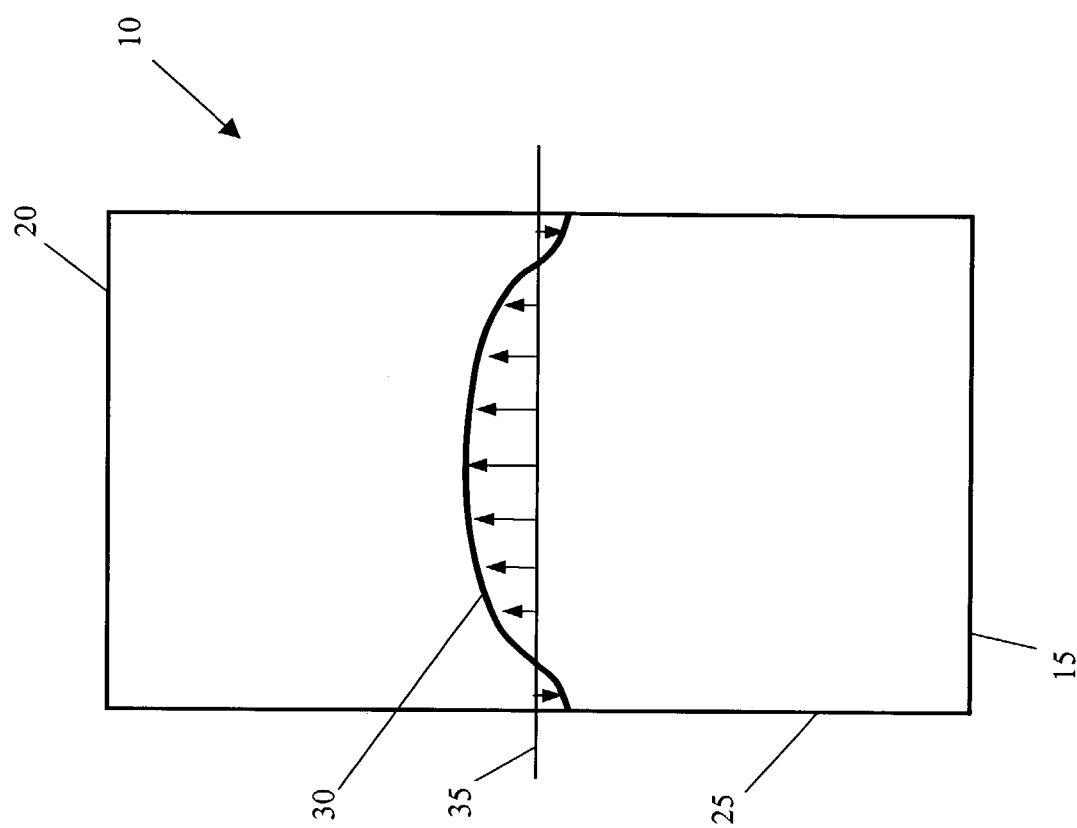
FIG. 1b shows a velocity profile for a multiphase reactor in accordance with the present invention.

There are shown in the Figures, and herein will be described in detail, specific embodiments of the present invention with the understanding that the present disclosure is to be considered an exemplification of the principles of the invention, and is not intended to limit the invention to that illustrated and described herein. The present invention is susceptible to embodiments of different forms or order and should not be interpreted to be limited to the particular methods or compositions contained herein. In particular, various embodiments of the present invention provide a number of different configurations of the overall gas to liquid conversion process.

The present invention is directed toward improving the operation of a multiphase reactor. Depending upon the reaction taking place at a given gas linear velocity, the configurations within the reaction zone of a multiphase reactor according to the present invention may result in a variety of benefits including but not limited to reduced backmixing, improved gas distribution, improved mass transport capabilities, smaller gas bubbles, improved reaction distribution, improved control over the heat of reaction and/or increased flexibility in reactor design. In general, embodiments of the present invention comprise having a dense configuration of internal structures in the central region of the multiphase reactor, or in the wall or outer region of the inside of the reactor, or combination thereof.

Typical flow in the gas agitated multiphase reactor is generated by the gas introduced into the reactor. When a gas is introduced into a reactor there will tend to be a higher gas holdup and upward flow in the central region of the reactor and a lower gas holdup and a downward flow in the annular or outer region of the reactor resulting in a flow curve as shown in FIG. 1a. FIG. 1a shows a cross section of a gas agitated multiphase reactor 10 having bottom 15, top 20 and side walls 25. It should be appreciated that FIG. 1 a is not intended to limit the present invention to the particular reactor or to the exact flow distribution shown. FIG. 1a is merely illustrative of the principles and spirit of the present invention.

In FIG. 1a, the gas phase is introduced through bottom 15 and out through top 20 of reactor 10. The rising gas acts to mix or agitate the slurry inside the reactor as it moves upward during operation. There is a tendency for the gas and slurry to have a greater upward flow in the central region and a greater downward flow at the wall regions 25 of the reactor. A velocity profile for reactor 10 is also shown in FIG. 1a represented by lines 30 and 35. Line 35 represents a baseline value of zero or no net flow in any direction. The area above line 35 represents a positive or upward flow and below line 35 represents negative or downward flow. As shown, the positive area under the curve is greater in the central region of the reactor and the negative area is greater near the walls 25 of reactor 10.

This phenomenon can be the result of many factors. For example, the degree of the liquid backmixing may be dependent upon the diameter of the reactor and the velocity of the gas phase. For illustration only, when a multiphase Fischer-Tropsch reactor of large diameter, e.g., about 0.5 to about 10 m, is operated in a turbulent flow regime with a high gas velocity, e.g., about 12 to about 50 cm/s, the reactor will experience the motion of large gas bubbles. However, using the principles of the present invention, the novel reactor configuration with internal structures allow reactors with higher diameters and/or greater gas velocities to operate as though they were comprised of smaller diameter and/or lower gas velocities.

Figure 1A:
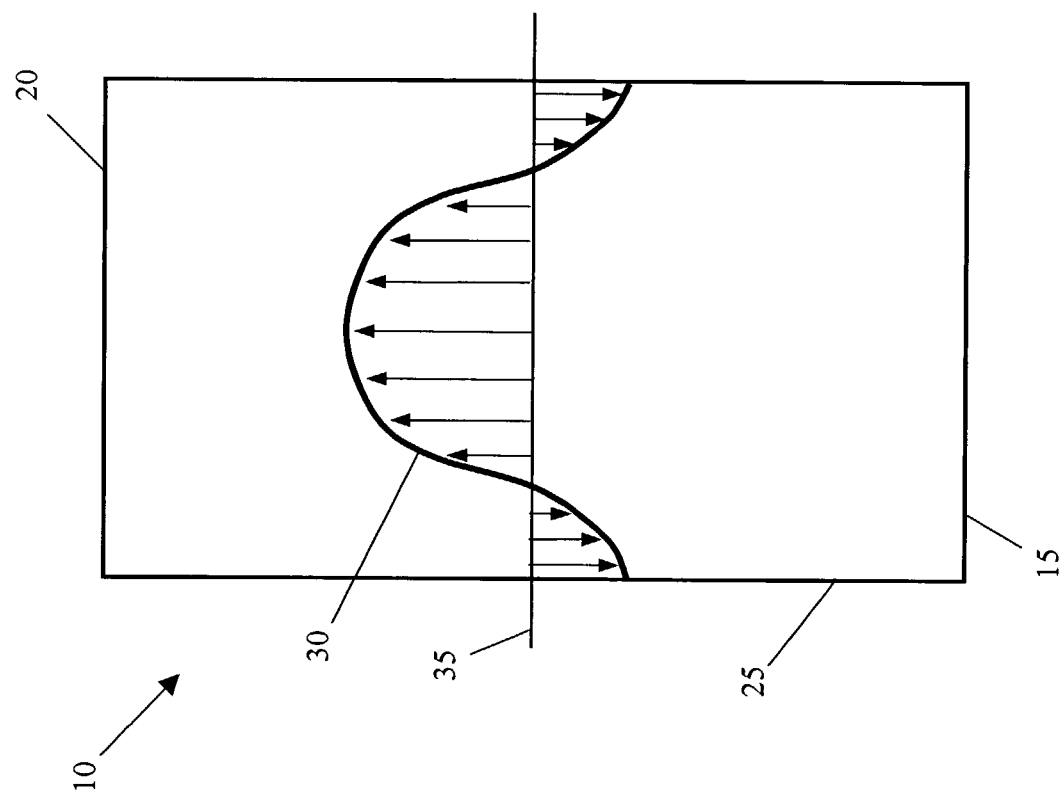
FIG. 1a shows a velocity profile for a typical multiphase reactor.

Still referring to FIG. 1, the extreme difference in flow values from the central region to the wall region can reduce, inter alia, productivity, mass and heat transfer. Thus, one embodiment of the present invention comprises a multiphase reactor in which the extremes of the flow distribution curve 30 move closer to the baseline 35. For example, continuing with the illustrative reactor example in FIG. 1a, a reactor in accordance with the present invention under similar operating conditions should have a new velocity profile as shown in FIG. 1b. As now shown in FIG. 1b, line 35 is more evenly distributed in both the positive and negative directions. This type of distribution allows the reaction to proceed with a more evenly distributed gas phase. A more even gas phase can result in smaller bubbles rising in the reactor. It will be appreciated by those or ordinary skill in the art that smaller bubbles can result in more available reactive surface area and more mass transport capabilities. The present invention will enable the operation of a multiphase reactor in a well-mixed gas regime, while retarding the formation of gas clouds.

As stated previously, the spirit of the present invention comprises reducing multiphase reactor backmixing and/or any related phenomenon. Structures in the central region impede the upward flow of gas and slurry in the central region and structures in the wall or outer region impede the downward flow of slurry along the wall and outer region by providing additional resistance to the flowing slurry and gas. The reduction of the liquid center velocity leads to the reduction of backmixing at a given gas velocity. Therefore, in a broad sense, the embodiments of the present invention are designed to manipulate the gas flow in the reaction zone of the multiphase reactor such that the tendency of the reactor to exhibit an increased upward flow through the central region and/or an increased downward flow along the wall or outer region, i.e., backmixing, is decreased.

Figure 2:
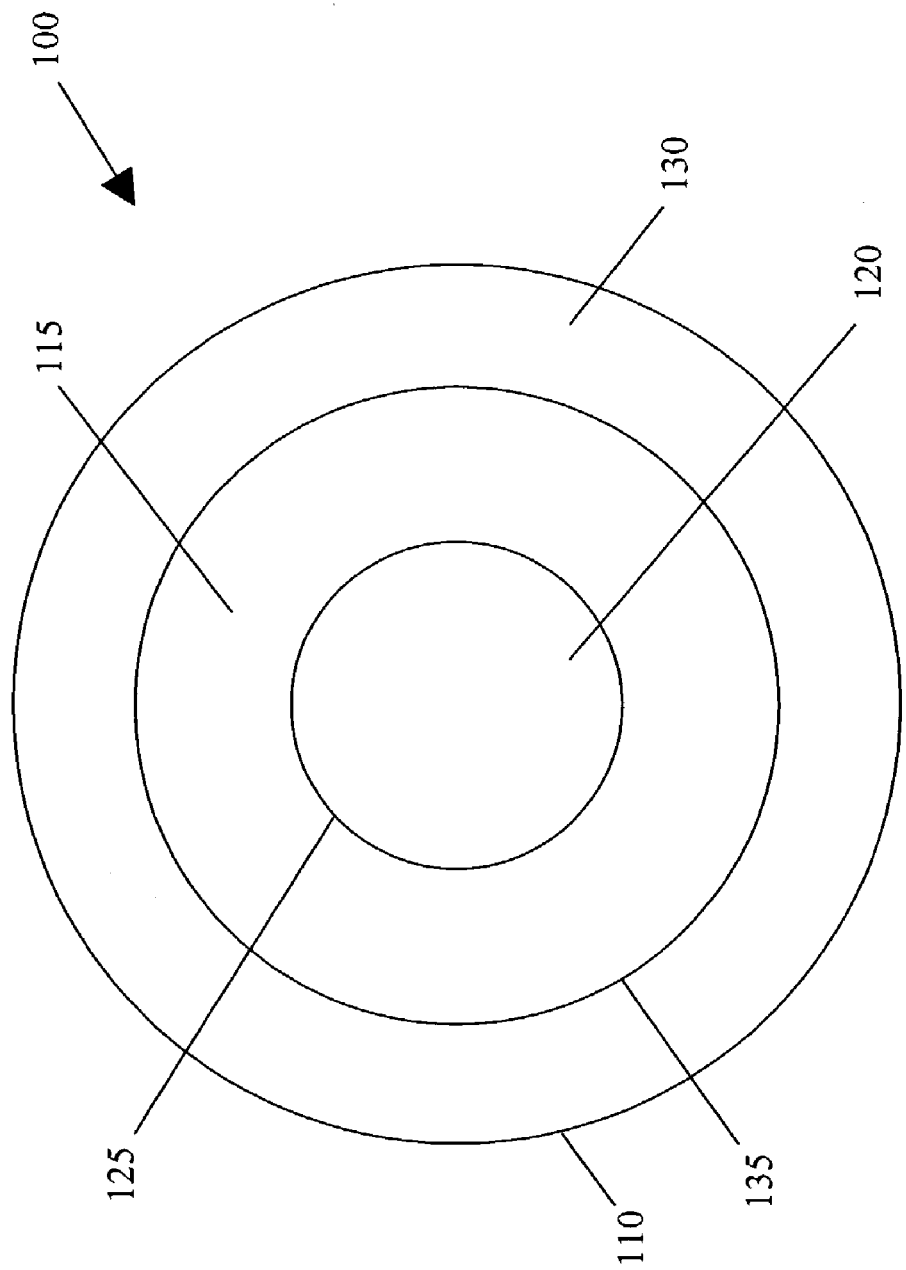
FIG. 2 shows the center and wall regions of a multiphase reactor in accordance with the descriptions of the present invention.

As described herein the present invention contemplates one or more regions within the reactor having one or more configurations of internal structures. FIG. 2 shows an example of how the different regions may be represented within a multiphase reactor. As shown, multiphase reactor 100 has an outer wall 110 having a diameter $D_r$, and one or more regions, including at least a center region 120 with an outer boundary 125 and having a diameter $D_c$, and a wall region 130 with an inner boundary 135 and having a distance of $D_w$ from the wall 110 to the inner boundary 135. In an embodiment in which there is one dense region and one less dense region, the center region 120 can be defined as having a diameter $D_c$ of from about 3 d (where d is the diameter of the internal tubes) to about ½ $D_r$. The wall region 130 can have a distance from the wall 110 to the inner boundary 135, i.e., $D_w$, from about 3 d to about ½ $D_r$. Again it should be appreciated that the drawings are not meant to be limiting and are used only to illustrate the spirit of the invention. For example, the internal structures should not be limited to heating/cooling tubes, nor the particular shapes illustrated. Other alternatives are clearly within the scope of the invention, e.g., the internal structures may be solid objects such as rods.

Alternatively, an embodiment in which there are two dense regions, namely, the center 120 and wall 130 regions, and one less dense region 115, the center region 120 can be defined as having a diameter $D_c$ of from about 3 d to about ⅓ $D_r$. The wall region 130 can be defined as having a distance from the wall 110 to the inner boundary 135, i.e., $D_w$, of about 3 d to about ⅓ $D_r$. The lean and dense populated regions can be characterized as having the ratio of the distances between centers of two tubes at two regions equal to or greater than 1.2. The distance between centers of two tubes should be equal to or greater than 1.2 d for the densely populated region.

Figure 3:
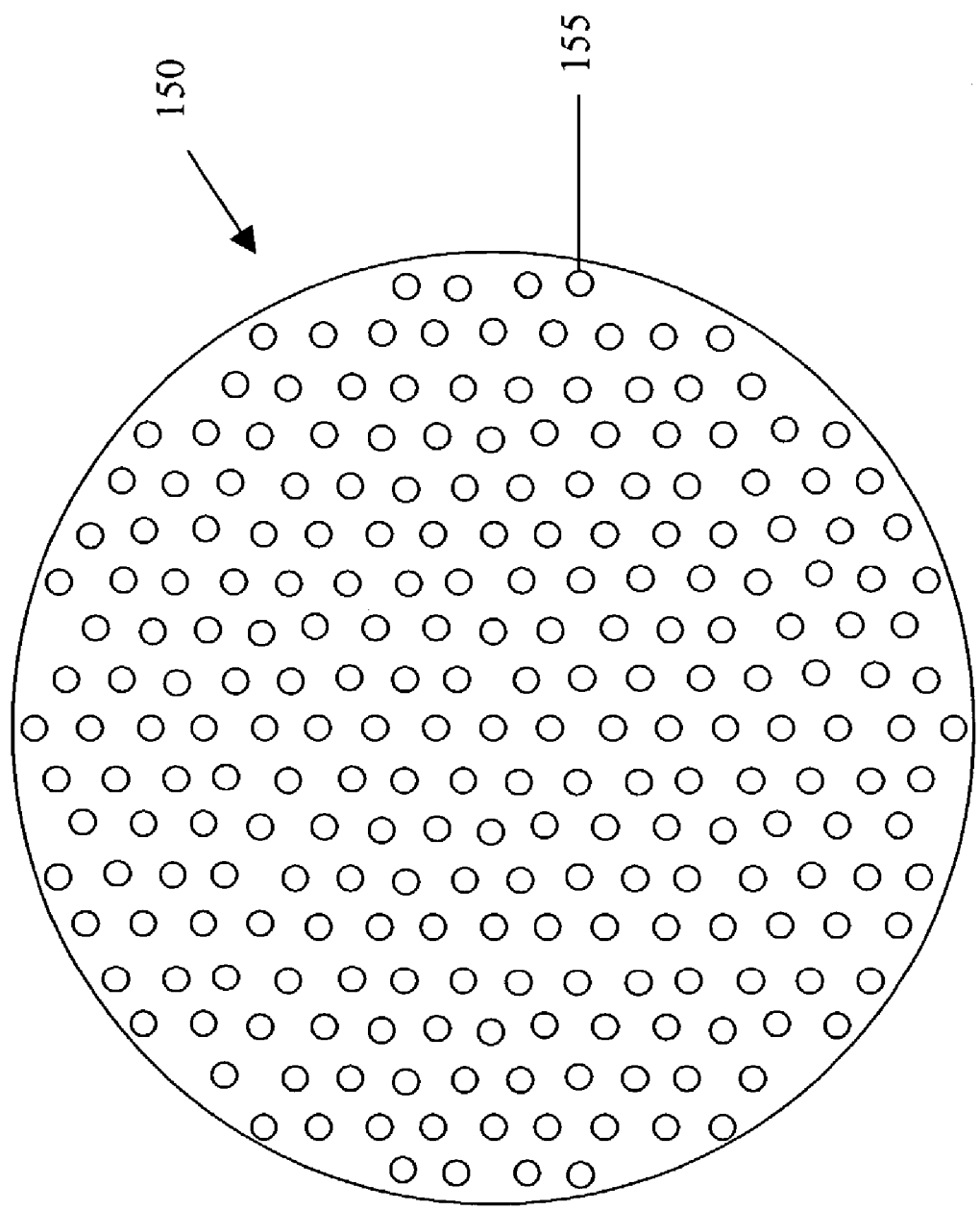
FIG. 3 shows a cross section of a multiphase reactor with uniformly distributed internal structures.

FIG. 3 shows a cross section of a multiphase reactor 150 with uniformly distributed internal structures 155. This is the typical configuration used in the art. As shown, the distance between two rows is about 2 d, where d is the diameter of the internal tubes. The distance between centers of two tubes is about 2.31 d. The present invention has discovered that there is a number of advantages in changing the configuration of the internal structures. FIGS. 3–6 show examples of cylindrical reactors containing cylindrical type internal structures, e.g., tubes, cooling coils, heating coils, baffles, etc., in accordance with the present invention. It should be appreciated that the number of tubes shown in FIGS. 3–6 equal the number of tubes shown in FIG. 3.

Figure 4:
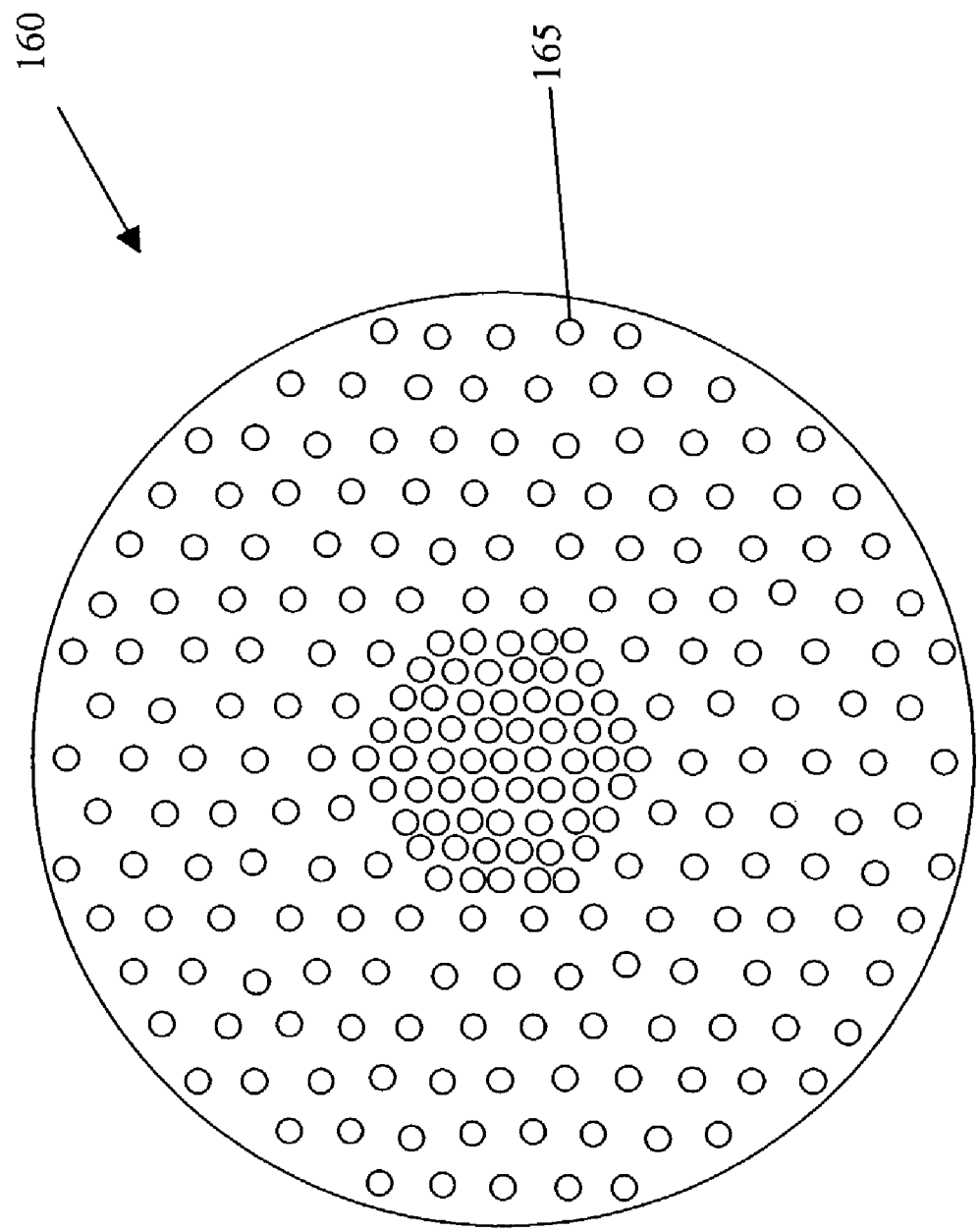
FIG. 4 shows a cross section of a multiphase reactor with a center-dense distribution of internal structures.
Figure 5:
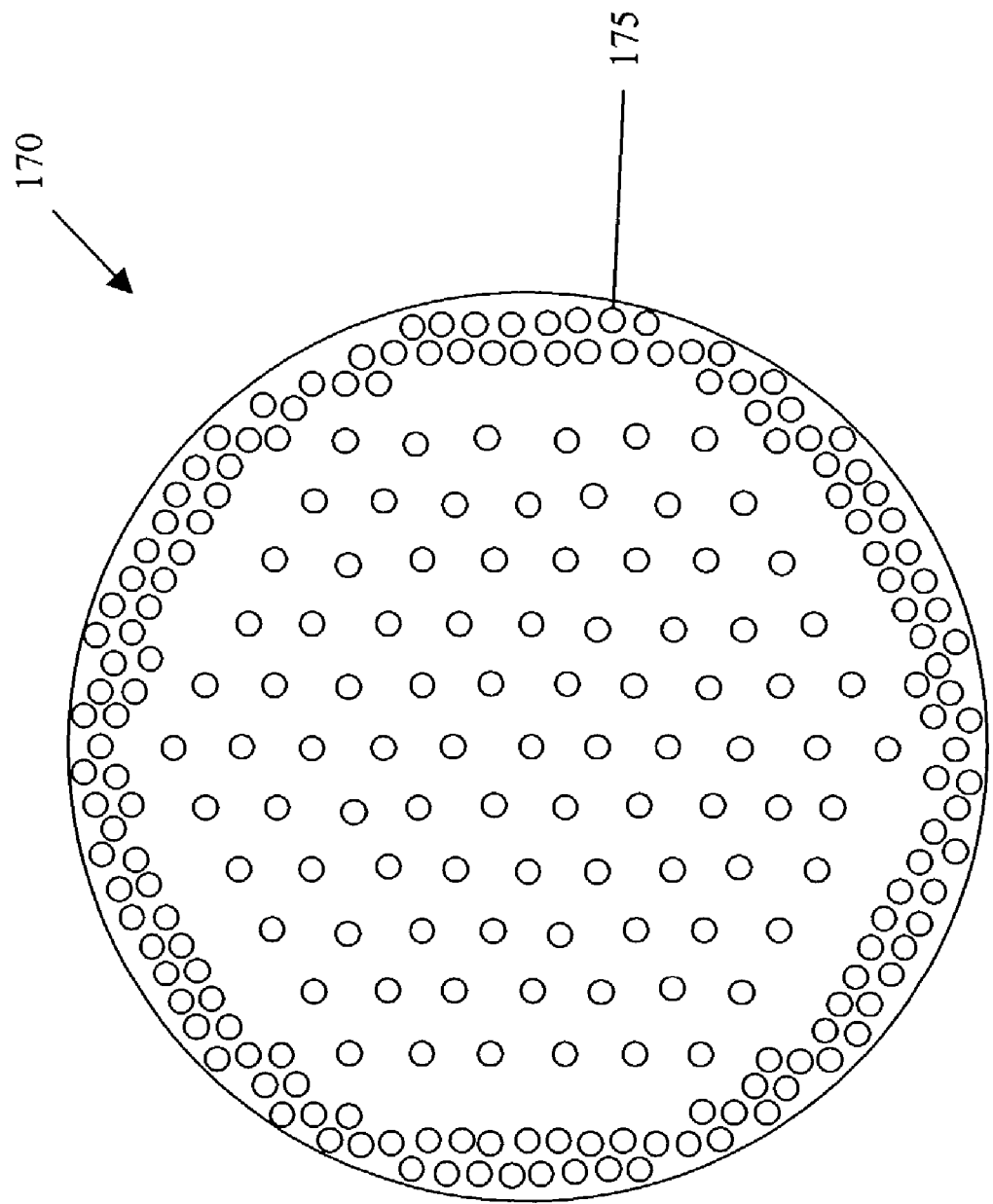
FIG. 5 shows a cross section of a multiphase reactor with a wall-side-dense distribution of internal structures.
Figure 6:
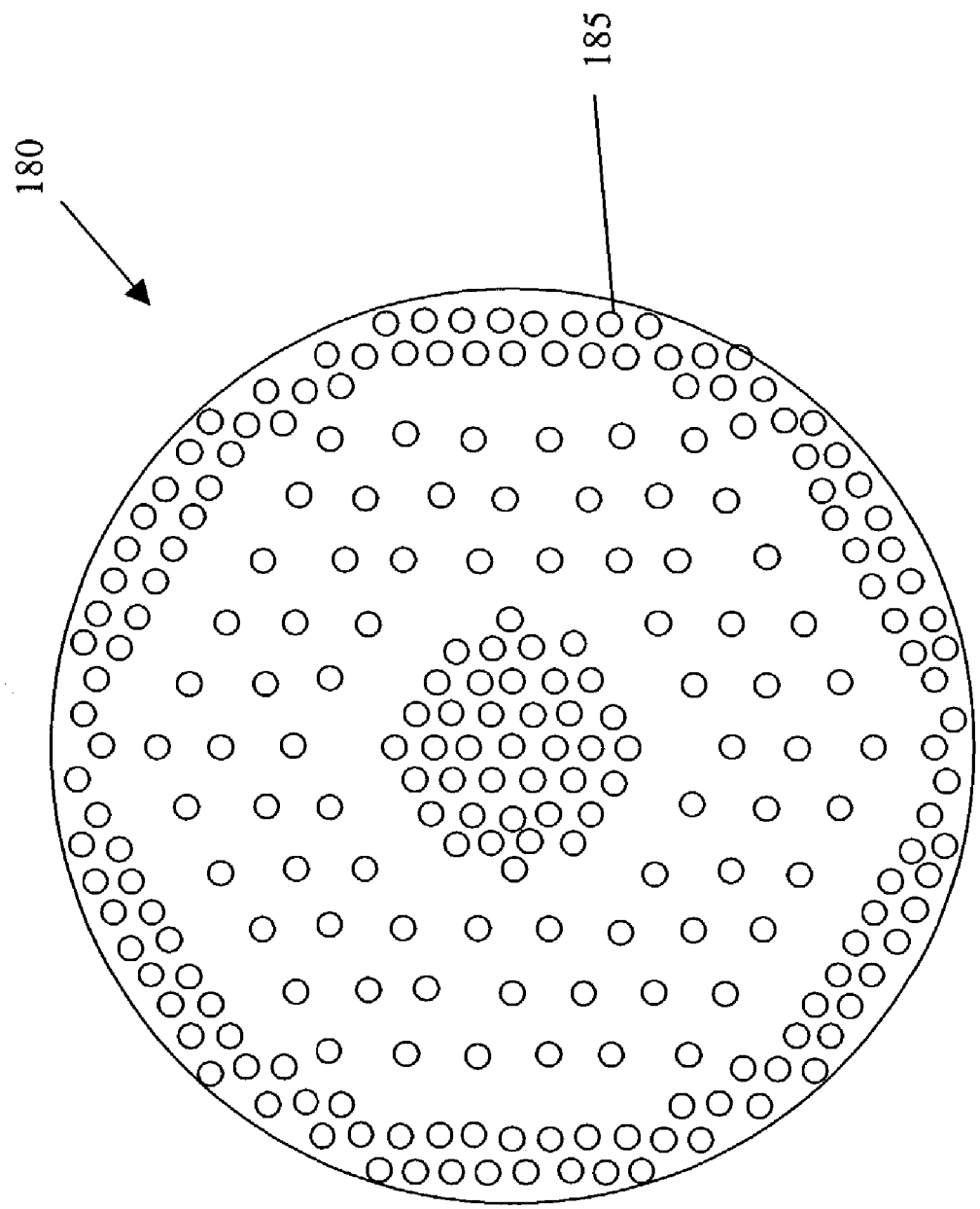
FIG. 6 shows a cross section of a multiphase reactor with a wall-and-center-dense distribution of internal structures.

FIG. 4 shows a cross section of a multiphase reactor 160 with a center-dense distribution of internal structures 165. FIG. 5 shows a cross section of a multiphase reactor 170 with a wall-side-dense distribution of internal structures 175. FIG. 6 shows a cross section of a multiphase reactor 180 with a wall-and-center-dense distribution of internal structures 185. For an example of a highly exothermic reaction such as a Fischer-Tropsch synthesis, the average distance between centers of two internal structures in the dense regions shown in FIGS. 4, 5 and 6 is from about 1.2 d to about 4 d, preferably from about 1.4 d to about 2 d. In the remaining less dense regions, the average distance between centers of two tubes is from about 1.4 d to about 8 d, preferably from about 2 d to about 4 d. The spacing of the internal structures in the lean regions compared to that in the dense regions is such that the average distance between centers of two internal structures in the lean regions is preferably from about 1.15 to about 7 times, more preferably from about 1.4 to about 3 times greater than the average distance between centers of two internal structures in the dense region.

Figure 8:
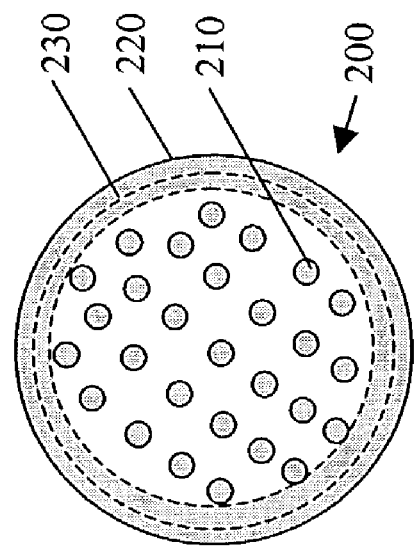
FIG. 8 shows of top view of the multiphase reactor shown in FIG. 3e.
Figure 7:
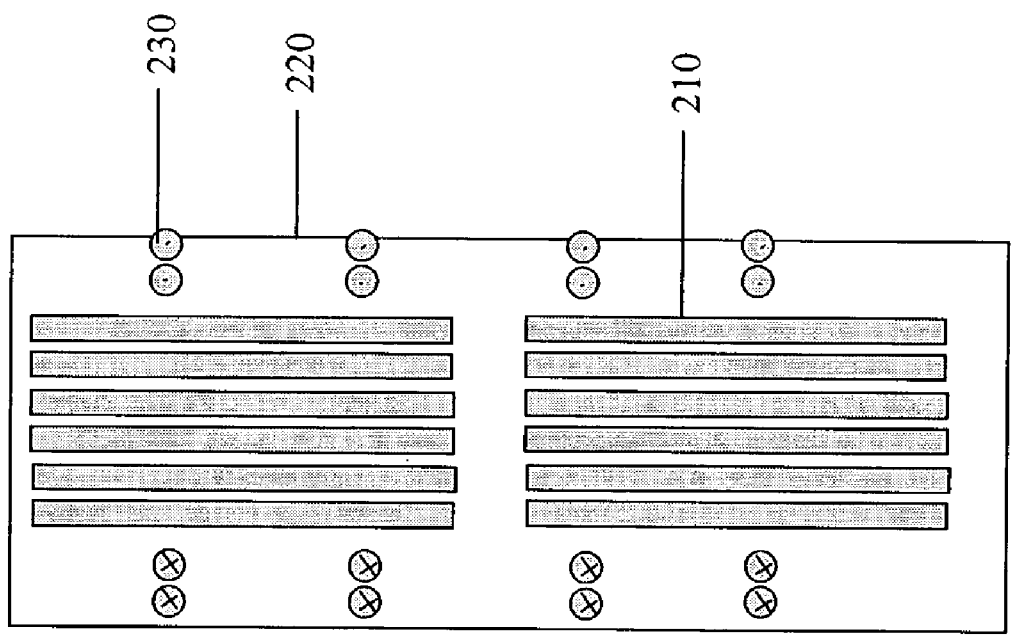
FIG. 7 shows a diagram and a cross section of a multiphase reactor with two types of internal structures placed at different radial and axial positions with d/Dr=0.15.

FIGS. 7 and 8 represent another embodiment for optimizing backmixing of a gas agitated multiphase slurry reactor by adding two types of internal structures into a reactor column. As shown in FIGS. 7 and 8, reactor 200 contains a series of central vertical tubes 210, located in the column and substantially aligned with the main axis of the reactor column 220, central vertical, and one or more layers of coil buffers 230 with a certain width, said coil buffers being placed at the wall region at an angle to the central axis of the column. This angle is preferably between about 75° to 105°, more preferably about 80°–100°. The added buffer coils 230 together with these central vertical tubes 210 can not only reduce the liquid backmixing (i.e., achieve a more leveled flow profile as illustrated by FIG. 1*b*), but also serve as heat transfer devices to improve the heat transfer of the system and to achieve a flatter axial temperature profile. For example, the coil buffers 230 used as heat transfer devices can be used additional cooling coils to help remove produced heat during an exothermic reaction such as the Fischer-Tropsch reaction, or heating coils to add heat during an endothermic reaction. Time-averaged liquid velocity profiles obtained from both experiments and computational fluid dynamics (CFD) simulations using a Fischer-Tropsch slurry column reactor show that the inverse point of liquid upflow and liquid downflow is located at about 0.35 Dr from the column central axis, where Dr is the inner diameter of the column. Therefore, the width of the coil buffers 230 is desired to be about 0.1 Dr to 0.30 Dr, preferably about 0.12 Dr to 0.20 Dr, more preferably about 0.15 Dr. The configuration of internal structures in FIGS. 7 and 8 illustrate a novel way to not only optimize the degree of the overall backmixing, but also to optimize the profile of back mixing along the column based on the application requirements. When more exothermic reaction conversions take place at the bottom part of the reactor column such as in the example for a Fischer-Tropsch synthesis, a greater reduction of backmixing is desired particularly at the bottom part of column rather than at the upper part of the column. However, the concept of using one or more sets of internal structures at different radial and/or axial positions, which can be placed a various angles to respect to the axis of the reactor is not limited to the use of a Fischer-Tropsch synthesis, as it can be applied to various applications which can use gas agitated multiphase reactors, whether the applications use exothermic, endothermic or isothermic synthesis. This embodiment teaches a means to optimizing backmixing by placing one or more sets of internal structures at different radial positions and/or at different axial positions, but also to optimizing the profile of liquid phase back mixing, regardless if heat needs to be removed or added within a reaction zone.

It should be appreciated that the configurations shown in FIGS. 4–8 are not intended to be limiting or exhaustive of all possible configurations of the present invention. They are merely examples provided to illustrate of the spirit of the invention. For example, the dense and non-dense regions are illustrated as uniformly spaced, but may be non-uniformly spaced and still create dense and non-dense regions in accordance with the spirit and scope of the present invention. In addition, the drawings are of cylindrical reactors and tubes, but any shape can be used without departing from the principles described herein. Thus, the scope of the present invention is not intended to be limited to any particular shape of reactor or internal structures.

As stated previously, the dense configurations of internal structures in the central and wall regions within the reactor result in an increase in the resistance against the flow of the slurry/gas phases. Along with the increase in the number of internal structures for a given region there is a corresponding increase in the surface area of the internal structures in the region. The increase in surface area in the flow path of the slurry/gas phases results in an increase in the liquid Peclet number. Thus, there is a correlation between an increase of the liquid Peclet number and a reduction of backmixing for a multiphase reactor under a given set of conditions.

Figure 9:
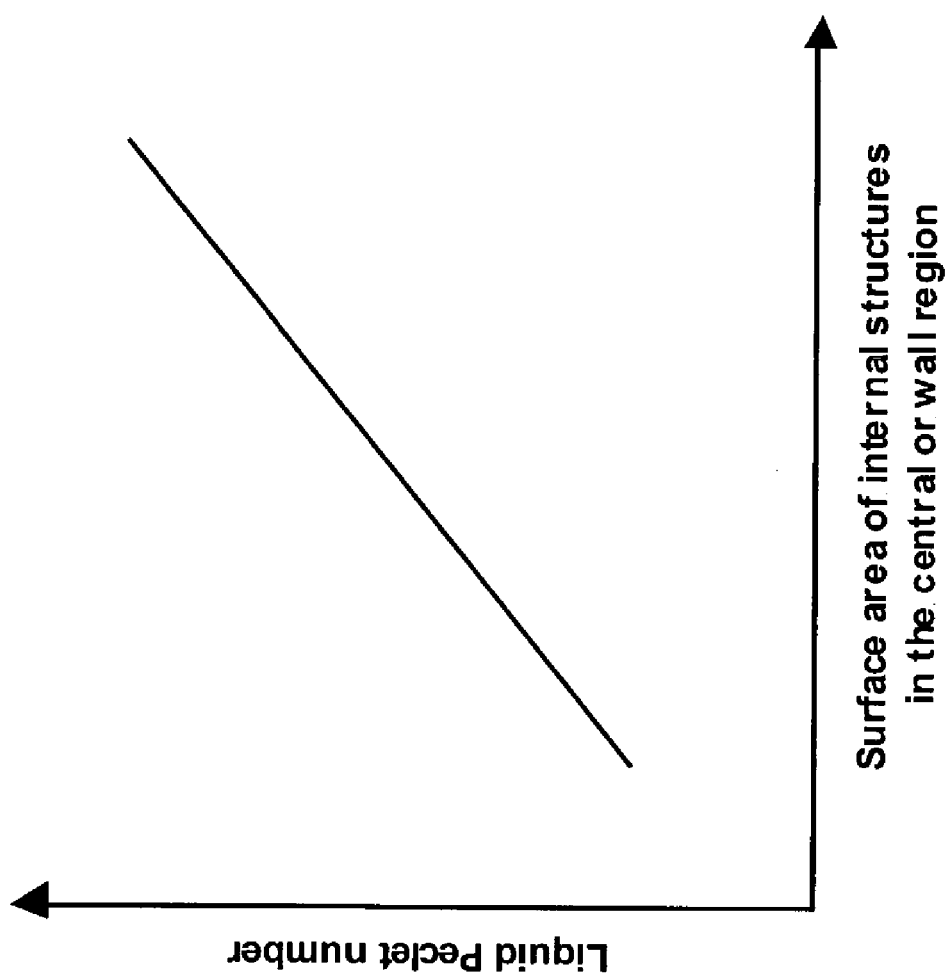
FIG. 9 is a graph of the liquid Peclet number plotted against the surface area in the central and/or wall region for a given multiphase Fischer-Tropsch reactor in accordance with the present invention.
Figure 10:
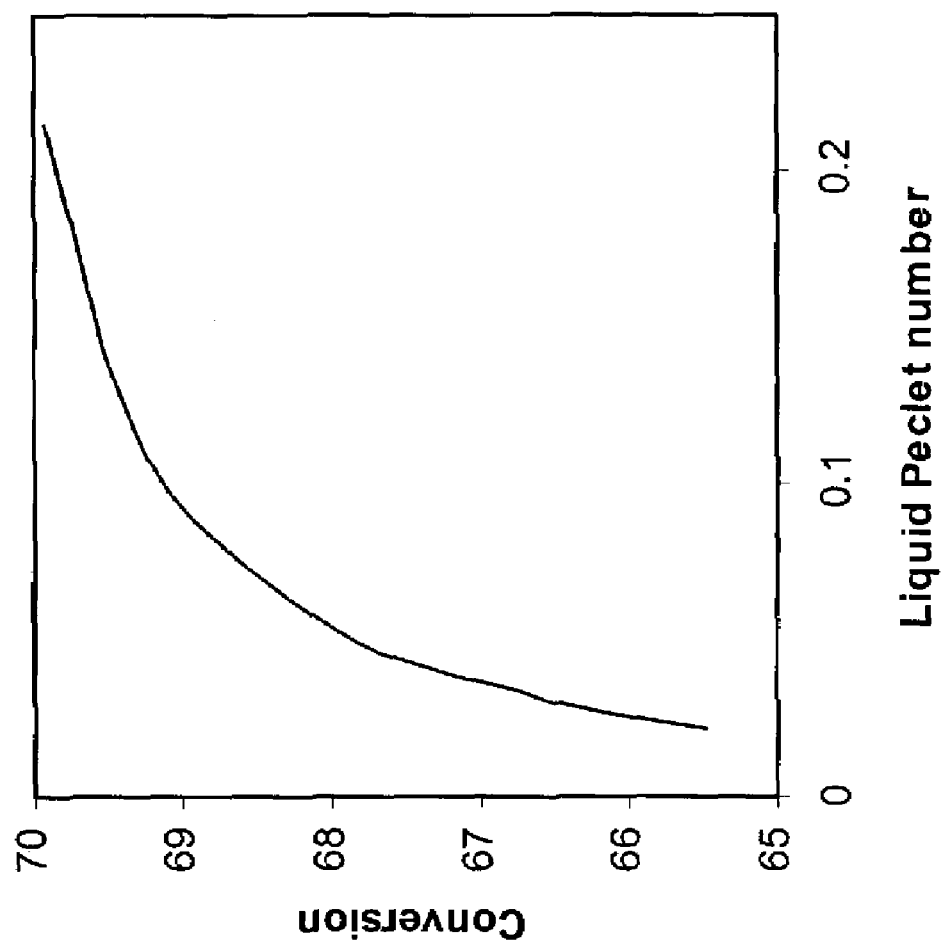
FIG. 10 is a graph showing the increase of the conversion of a mutiphase Fischer-Tropsch reactor with the increase of the liquid Peclet number at a gas linear velocity of 30 cm/s.
Figure 11:
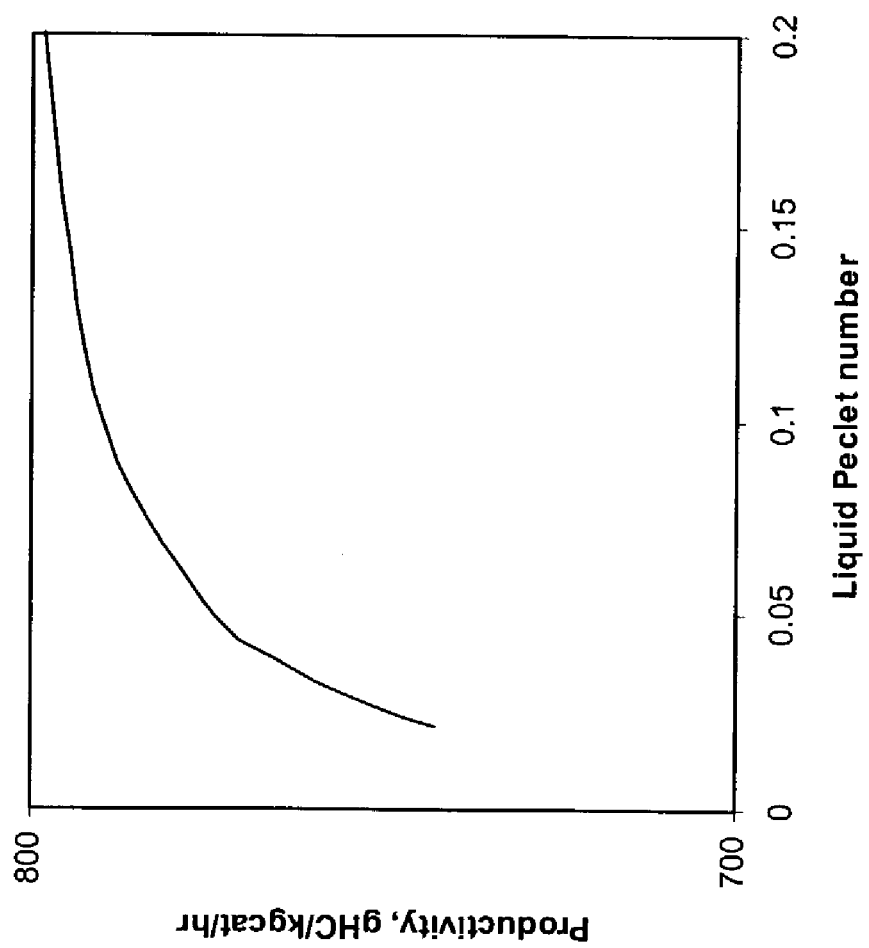
FIG. 11 is a graph showing an increase in the productivity of a multiphase Fischer-Tropsch reactor with the increase of the liquid Peclet number at a gas linear velocity of 30 cm/s.

FIG. 9 illustrates the concept of increasing Peclet number with the increase of surface area of internal structures in the center or wall region or both regions. It should be noted that the actual relationship between the liquid Peclet number and the surface area of internal structures in the central and wall region is dependent on actual configurations and is not necessarily linear. At a given gas velocity, the increase of the liquid Peclet number gives rise to the simultaneous increase of the conversion and productivity of a multiphase reactor. FIGS. 10 and 11 show such an example of the Fischer-Tropsch synthesis. At a superficial gas velocity of 30 cm/s and typical Fischer-Tropsch operating conditions, FIG. 10 shows an increase of the conversion of a slurry reactor with the increase of the liquid Peclet number. Likewise, FIG. 11 shows the corresponding increase in the productivity with the increase of the liquid Peclet number. The results are generated using the axial dispersion model for multiphase slurry bubble columns. It should be noted that all other design and operating conditions are fixed in generating FIGS. 10 and 11 except the increased surface area of internal structures in the central or wall region or both regions which introduces the increase in liquid Peclet number. The simultaneous increase of the conversion and productivity is a desirable feature for a multiphase reactor.

Another embodiment of the present invention comprises a Fischer-Tropsch multiphase reactor, preferably slurry bubble column reactor. Although Fischer-Tropsch reactors are expressly mentioned, the present invention is equally applicable to other types of multiphase reactions. Fischer-Tropsch reactors are expressly mentioned herein only as a preferred embodiment and for the sake of clarity and illustration. One skilled in the art will readily understand the applicability of the present invention towards other multiphase reactions. Thus, this specificity should not be interpreted as limiting but instead the present invention should be limited only by the claims as provided.

Nonetheless, in a preferred embodiment, the multiphase reactor will comprise a Fischer-Tropsch reactor. Any Fischer-Tropsch multiphase technology and/or methods known in the art will suffice. The feed gases charged to the process of the invention comprise hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. Preferably the hydrogen is provided by free hydrogen, although some Fischer-Tropsch catalysts have sufficient water gas shift activity to convert some water and carbon monoxide to carbon dioxide and hydrogen for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.8 to 2.3:1. Preferably, when iron catalysts are used the feed gas stream contains hydrogen and carbon monoxide in a molar ratio between about 1.4:1 and 2.2:1. The feed gas may also contain carbon dioxide. The feed gas stream should contain a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia and carbonyl sulfides.

The Fischer-Tropsch process is typically run in a continuous mode. In this mode, the gas hourly space velocity through the reaction zone typically may range from about 50 to about 10,000 hr$^{-1}$, preferably from about 300 hr$^{-1}$ to about 2,000 hr$^{-1}$. The gas hourly space velocity is defined as the volume of reactants per time per reaction zone volume. The volume of reactant gases is at standard pressure (101 kPa) and standard temperature of 0° C. The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psia (552 kPa) to about 1000 psia (6895 kPa), more preferably from 80 psia (552 kPa) to about 600 psia (4137 kPa), and still more preferably, from about 140 psia (965 kPa) to about 500 psia (3447 kPa).

As the syngas feedstock is introduced into the Fischer-Tropsch reactor the gas bubbles up and through the slurry column. The Fischer-Tropsch reactor column should be configured according to the principles of the present invention. The gas generally serves to maintain some level of mixing as it transfers up the column. As the gas moves upward, it comes in contact with the catalyst material and the hydrocarbon synthesis reaction takes place. In addition, the gas will come in contact with the internal structures creating a more even distribution of smaller gas bubbles, which should enhance the productivity and conversion in the reactor. Products are formed including hydrocarbons and water. Water is a by-product of the Fischer-Tropsch reaction as shown in equation (1).

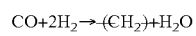

(1)

Fischer-Tropsch catalysts are well known in the art and generally comprise a catalytically active metal, a promoter and a support structure. The most common catalytic metals are Group 8, 9 and 10 of the periodic table metals, such as cobalt, nickel, ruthenium, and iron or mixtures thereof. The preferred metals used in Fischer-Tropsch catalysts with respect to the present invention are cobalt, iron and/or ruthenium, however, this invention is not limited to these metals or the Fischer-Tropsch reaction. Other suitable catalytic metals include group 8, 9 and 10 metals. The promoters and support material are not critical to the present invention and may be comprised, if at all, by any composition known and used in the art. The preferred support compositions are alumina, silica, titania, zirconia or mixtures thereof.

As stated above, the feedstock for a Fischer-Tropsch reaction is syngas, i.e., gas comprised mainly of hydrogen and carbon monoxide. Typically, syngas is produced in a syngas reactor in connection with producing Fischer-Tropsch products. According to the present invention, a syngas reactor can comprise any of the synthesis gas technology and/or methods known in the art. Synthesis gas can be produced from a hydrocarbon-containing feed and oxygen-comprising feed. The hydrocarbon-containing feed is almost exclusively obtained as a mixture of light hydrocarbons, preferably natural gas. However, the most important component is generally methane. Similarly, the oxygen-containing gas may come from a variety of sources and will be somewhat dependent upon the nature of the reaction being used. For example, a partial oxidation reaction requires diatomic oxygen as a feedstock while steam reforming requires only steam. According to the preferred embodiment of the present invention, partial oxidation is assumed for at least part of the syngas production reaction.

While preferred embodiments of this invention have been shown and described, modification thereof can be made by one skilled in the art without departing from the spirit or teaching of this invention. The embodiments described herein are exemplary only and are not limiting. Many variations and modifications of the processes are possible and are within the scope of this invention. For example, there are numerous configurations of internal structures that can help reduce backmixing without departing from the spirit of the present invention. Also, although the internal structures are referred to in the plural, it is within the scope of the present invention that all of the internal structures are a single unit. For example, if the structures are part of cooling or heating coils, the coil may be a continuous set of vertical tubes connected at alternating ends with a inlet and outlet tube. Likewise, the structures may be a several sets of coils with multiple vertical components and/or multiple horizontal components. In yet another example, it is contemplated that the internal structures may be of varying size, in which case the references to diameter d of such tubes is intended as the average diameter of the tubes in the region in which they are located. Likewise, the references to distances between tubes and rows in this situation is also intended as an average of those respective values for the region in which they are located. In yet another example, it is contemplated that the internal structures may be rods of various cross-sectional shapes (circular, trilobe, oval, rectangular-or square, or irregular-shaped for example), in which case the references to diameter d of such structures would be their maximum width. Those of ordinary skill in the art will appreciate that many other variations are possible and within the spirit and scope of the present invention. Accordingly, the scope of protection is not limited to the embodiments described herein, but is only limited by the claims that follow, the scope of which shall include all equivalents of the subject matter of the claims. In addition, unless order is explicitly recited, the recitation of steps in a claim is not intended to require that the steps be performed in any particular order, or that any step must be completed before the beginning of another step.

What is claimed is:

1. A process for producing hydrocarbons comprising:
   contacting a gas stream in a multiphase reactor having a reaction zone having a central region, an outer region and comprising internal structures arranged to configure at least one dense region and one lean region of internal structures within the reaction zone under conditions effective to produce synthesis products, wherein at least a portion of the synthesis products are liquid under the operating conditions of the multiphase reactor and wherein the configuration of internal structures reduces the radial variation of the axial resistance to flow within the reactor.

2. The process according to claim 1 wherein the dense region is located in the central region of the reaction zone.

3. The process according to claim 1 wherein the dense region is located in the outer region of the reaction zone.

4. The process according to claim 1 wherein the multiphase reactor comprises separate dense regions at both a central and outer region within the reaction zone.

5. The process according to claim 1 wherein the average distance between the center of two internal structures in the dense region is from about 1.2 d to about 4 d, wherein d is the diameter of the internal structures.

6. The process according to claim 1 wherein the average distance between the center of two internal structures in the dense region is from about 1.4 d to about 2 d, wherein d is the diameter of the internal structures.

7. The process according to claim 1 wherein the average distance between the center of two internal structures in the lean region is from about 1.4 d to about 8 d, wherein d is the diameter of the internal structures.

8. The process according to claim 1 wherein the average distance between the center of two internal structures in the lean region is from about 2 d to about 4 d, wherein d is the diameter of the internal structures.

9. The process according to claim 1 wherein the average distance between centers of two internal structures in the lean region is from about 1.15 to about 7 times greater than the average distance between centers of two internal structures in the lean region.

10. The process according to claim 1 wherein the average distance between centers of two internal structures in the lean region is from about 1.4 to about 3 times greater than the average distance between centers of two internal structures in the dense region.

11. The process according to claim 1 wherein the multiphase reactor comprises a Fischer-Tropsch synthesis.

12. The process according to claim 1 wherein the internal structures comprise one or more structures selected from the group consisting of solid objects, tubes, coils and baffles.

13. The process according to claim 1 wherein the internal structures comprise one or more structures selected from the group consisting of cooling tubes, heating tubes, rods, cooling coils, and heating coils.

14. The process according to claim 12, wherein the coils comprise a continuous set of vertical tubes connected at alternating ends with an inlet and outlet tube.

15. The process according to claim 1 wherein the internal structures comprise a series of central vertical tubes substantially aligned with the main axis of the reactor.

16. The process according to claim 1 wherein the internal structures have a cross-sectional shape selected from the group consisting of circular, trilobe, oval, rectangular, square, irregular-shaped and combinations thereof.

17. The process according to claim 1 wherein the internal structures comprise one or more structures selected from the group consisting of sets of coils with multiple vertical components, multiple horizontal components and combination thereof.

18. The process according to claim 1 wherein the internal structures are active structures.

19. The process according to claim 1 wherein the multiphase reactor is a slurry bubble column reactor.

20. The process according to claim 1 wherein the gas comprises hydrogen and carbon monoxide.

21. The process according to claim 1 wherein the reaction zone comprises a catalyst comprising cobalt, ruthenium, iron, or any combination thereof.

22. The process according to claim 2 wherein the multiphase reactor comprises an outer wall characterized by diameter $D_r$; the central region characterized by diameter $D_c$; and the internal structures are characterized by diameter d, and wherein $D_c$ is from about 3 d to about ½ $D_r$.

23. The process according to claim 3 wherein the multiphase reactor comprises an outer wall characterized by diameter $D_r$; the outer region comprises an inner boundary and has a distance $D_w$ from the outer wall to the inner boundary; and the internal structures are characterized by diameter d, and wherein $D_w$ is from about 3 d to about ½ $D_r$.

24. The process according to claim 3 wherein the internal structures in the outer region comprise one or more layers of coil buffers.

25. The process according to claim 24 wherein the multiphase reactor comprises an outer wall characterized by diameter $D_r$ and the coil buffers have a width between from about 0.1 $D_r$ to about 0.3 $D_r$.

26. The process according to claim 1 wherein the multiphase reactor is non-cylindrical.

27. The process according to claim 1 wherein the internal structures are uniformly spaced within the reaction zone.

28. The process according to claim 1 wherein the internal structures are non-uniformly spaced within the reaction zone.

* * * * *